Figure 1:
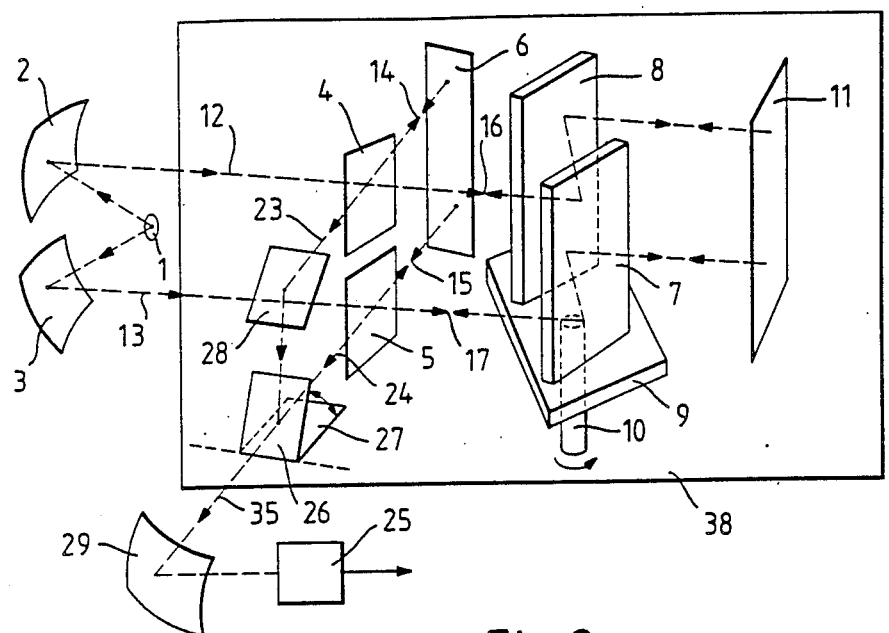

United States Patent [19]

Perkins

[11] Patent Number: 4,681,445

[45] Date of Patent: Jul. 21, 1987

[54] INTERFEROMETER

[75] Inventor: Charles V. Perkins, Cambridge, England

[73] Assignee: U.S. Philips Corporation, New York, N.Y.

[21] Appl. No.: 755,631

[22] Filed: Jul. 16, 1985

[30] Foreign Application Priority Data

Jul. 18, 1984 [GB] United Kingdom ................. 8418308
Feb. 27, 1985 [GB] United Kingdom ................. 8505069

[51] Int. Cl.$^4$ .............................................. G01J 3/45
[52] U.S. Cl. ................................................. 356/346
[58] Field of Search ............................... 356/346, 358

[56] References Cited

PUBLICATIONS

Martin, *Infrared Interferometric Spectrometers*, pub. by Elsevier Scientific Pub. Co., New York, pp. 197-201, 1980.

*Primary Examiner*—Davis L. Willis
*Assistant Examiner*—Matthew W. Koren
*Attorney, Agent, or Firm*—Paul R. Miller

[57] ABSTRACT

In beam splitting interferometers for use in Fourier transform spectrometers working in the infra-red region from 2.5 microns to 50 microns wavelength, it is impossible to provide a single beam splitting assembly which is efficient over the whole wavelength range, due to the limitations of available materials. In a set of interchangeable beam splitters it is difficult to ensure sufficiently accurate registration of each beam splitter after a change. The invention provides a set of beam splitters held stationary in separated locations and radiation directing means which passes an input beam through a beam splitter, which selects the recombined beam emerging from a desired beam splitter, and which passes it to a detector in a fixed location.

20 Claims, 6 Drawing Figures

INTERFEROMETER

This invention relates to an interferometer comprising a radiation source, a plurality of beam splitters, each functioning in a different part of the spectrum of the source radiation, radiation directing means for guiding an input beam of radiation from the source through a beam splitter to produce two subbeams which traverse separated paths before returning to that beam splitter to form a recombined beam, and means for varying the difference in path length of the two subbeam paths. A Fourier transform spectrometer is an example of an instrument using such an interferometer. The variation in the output signal of a detector receiving the recombined beam as a function of the varied path length can be analysed by known Fourier transform methods to yield the spectrum of the input radiation beam.

Such a spectrometer may be used in the infrared region with a useful wavelength range being typically from $2.5\mu$ to $50\mu$. Practical beam splitters are usually provided on one surface of an optically flat radiation transparent substrate, sometimes with a compensating plate on top of the beam splitter. With the available materials for beam splitters, substrate and compensating plate, it is difficult to provide a single beam splitting assembly which is sufficiently transparent and has an efficient beam splitting ratio close to 50/50 over the entire infrared region. At least two, and maybe more, beam splitters are generally used, each functioning in a different part of the range. Means must then be provided for moving a first beam splitter out of the interferometer and replacing it with a second with care being taken to ensure precise parallelism of the plane of the second beam splitter with that of the first beam splitter. Any lack of parallelism will produce a displacement of the center of the interference pattern from the detector, seriously degrading the signal obtained. Hitherto, wide spectral range Fourier transform spectrometers have used a turret of beam splitters with a precision mechanism for moving each beam splitter into position, in turn, in the interferometer. In the Genzel interferometer, described in the textbook "Advances in Raman Spectroscopy" 1983 Vol 10 Chapter 5 pages 286 to 288, as many as six beam splitters are mounted around the rim of a wheel.

It is an object of the invention to provide a simplified arrangement for using two or more beam splitters in an interferometer.

The invention provides an interferometer as defined in the opening paragraph, characterised in that the beam splitters are in fixed locations and in that the radiation directing means is effective to pass the recombined beam from a selected beam splitter to an output. The cost of wide range interferometers can be reduced and the repeatability of operation improved if the beam splitters are mounted in fixed positions in the interferometer. Each beam splitter is now available for separate adjustment when setting up the interferometer for each part of the spectrum and these adjustments are not disturbed when changing from one part of the spectrum to another. The radiation directing means may further comprise means for producing separate input beams, one for each of the beam splitters.

The radiation directing means may comprise a first fixed mirror on which a first recombined beam is incident and a second movable mirror, the second mirror being movable between a first position in which it directs the first recombined beam reflected from the first mirror to the output and a second position in which it allows the second recombined beam to pass to the output. Alternatively, the radiation directing means may comprise a mirror unit, with the mirror unit comprising a pair of plane parallel mirrors and with the planes of the mirrors being separated from one another and the unit being rotatable, about an axis parallel to the planes of the mirrors, from a first position, in which one recombined beam is reflected by each mirror of the unit to emerge on a path to the detector, to a second position in which the other recombined beam passes directly along the path to the output.

The means for producing separate input beams may comprise means for directing a single input beam to a selected one of the beam splitters. This enables a single input beam and collimating lens to be used. The input beam now only passes through one of the beam splitters at any one time.

The radiation directing means may comprise a carriage carrying an input reflecting element with and an output reflecting element, the carriage being mounted on a slide and being movable to a plurality of positions and with the input reflecting element being effective to direct radiation from the source onto a selected beam splitter in each of the positions and the output reflecting element being effective to direct the recombined beam from the selected beam splitter to the output.

This also enables a single input beam and collimating lens to be used. The number of beam splitters may now be increased without significant further complication being required in the radiation directing means with the movement of the carriage merely being increased to accommodate additional beam splitters.

The path length difference variation device in any design of interferometer is usually an expensive piece of precision mechanics. Sharing the device between the two subbeams from each beam splitter effects a considerable simplification and cost reduction.

The first of the subbeams from a beam splitter may traverse a path of fixed length before returning to the beam splitter with the second subbeam from the beam splitter traversing a path via a common path length variation device before returning to the beam splitter. U.S. Pat. No. 4,383,762 describes an interferometer in which the path length of both subbeams from a beam splitter is varied with one subbeam path length being increased while the other is simultaneously reduced. The path length variation device of an interferometer according to the present invention may now be more compact since it does not contain the two separated subbeams from each beam splitter.

Figure 2:
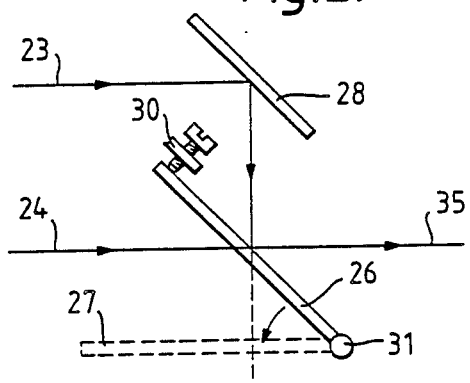
Figure 3:
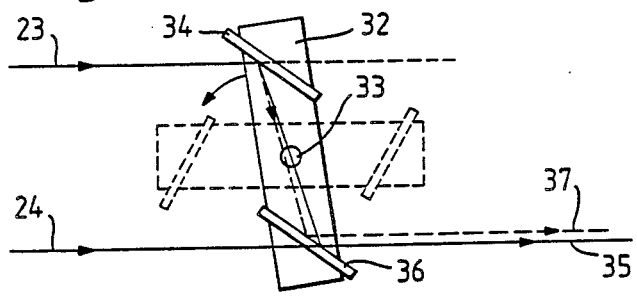
Figure 4:
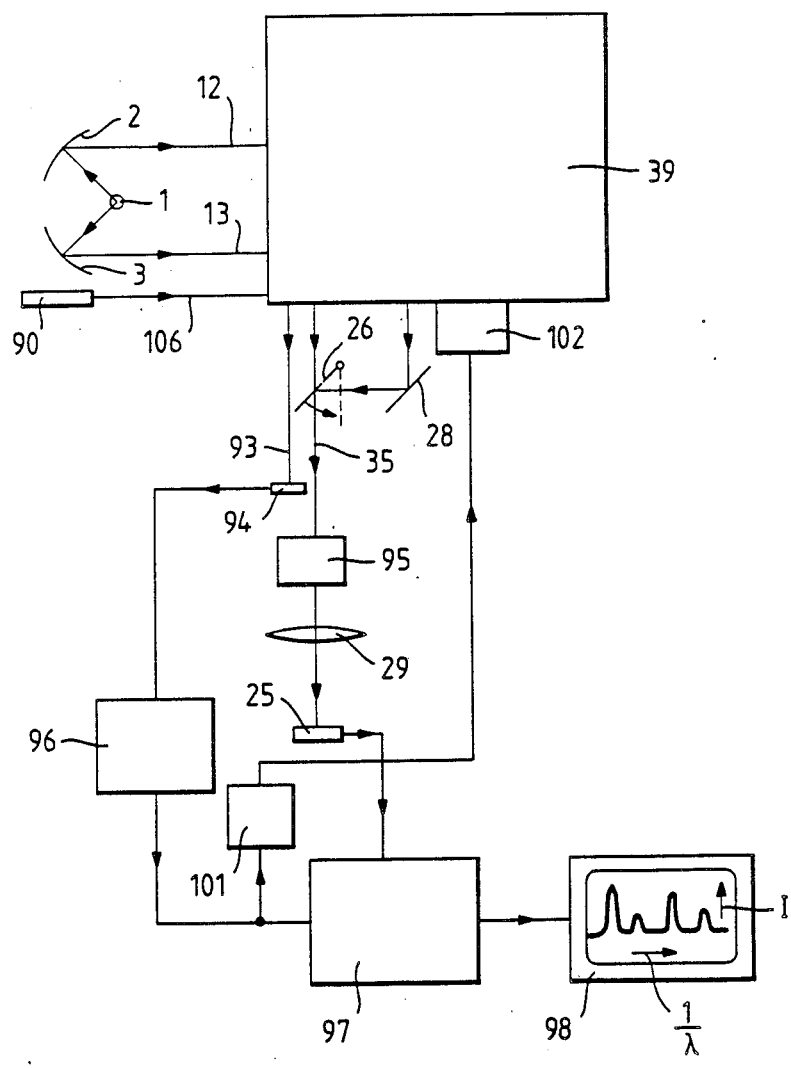
Figure 5:
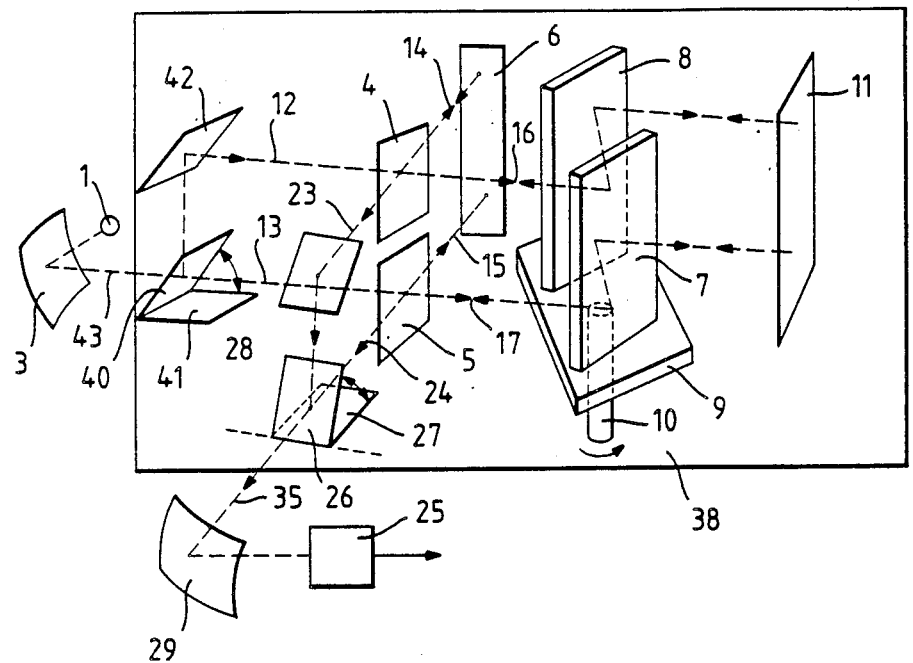
Figure 6:
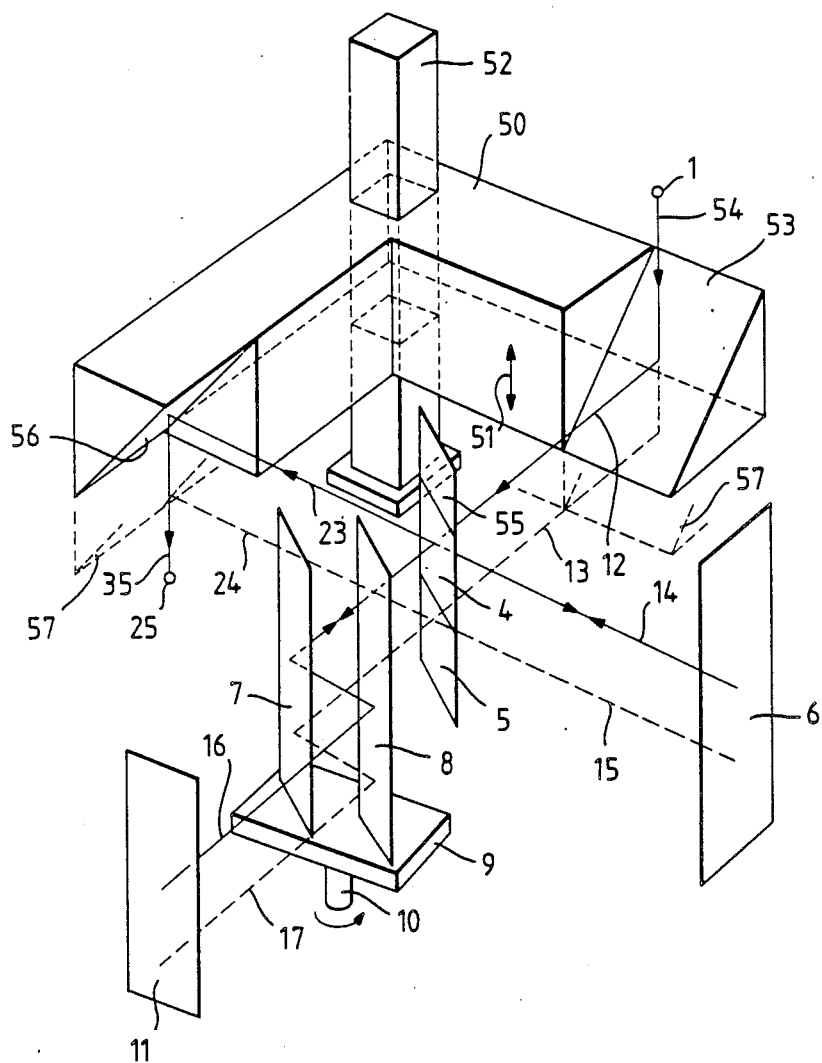

Embodiments of the invention will now be described, by way of example, with reference to the accompanying drawings in which:

FIG. 1 shows the schematic layout of a double interferometer having a single switched output beam and a single detector, FIG. 2 shows a first output beam switching arrangement, FIG. 3 shows a second output beam switching arrangement, FIG. 4 shows a Fourier transform infrared spectrometer employing the switched double interferometer of FIG. 1, FIG. 5 shows a double interferometer having a single switched input beam as well as a single switched output beam and a single detector, and FIG. 6 shows a multiple interferometer in which the input beam is translated, parallel to itself, from one beam splitter to another.

Referring to FIG. 1, a wide band source 1 supplies diverging radiation to two off-axis concave collimating mirrors 2 and 3 which supply parallel input beams of radiation 12 and 13 to beam splitters 4 and 5 respectively. Beam splitter 4 functions effectively in the longer wavelength range and beam splitter 5 in the shorter wavelength range with the two ranges overlapping to a small extent. Each beam splitter divides its input beam into one subbeam 14 (15) and into another subbeam 16 (17). A common plane beam reversing mirror 6 is provided for sub-beams 14 and 15 in the arms of fixed optical path length. The other subbeams 16 and 17 are incident upon a common path length variation device comprising a pair of plane parallel mirrors 7 and 8, mounted on platform 9 for rotation as an assembly about axis 10. The mirrors 7 and 8 are of sufficient vertical extent to reflect both subbeams 16 and 17 transmitted by the beam splitters. A common plane beam reversing mirror 11 is also of sufficient vertical extent for both subbeams 16 and 17. The reversed subbeams retrace their paths to their respective beam splitters, subbeams 16 and 17 returning through the common path length variation device and subbeams 14 and 15 directly via a path of fixed length. Parts of subbeams 14 and 15 are transmitted by their beam splitters and parts of subbeams 16 and 17 are reflected by the beam splitters to form recombined beams 23 and 24. The recombined beams are then incident on a radiation directing means in the form of a switching arrangement comprising a fixed plane mirror 28 and a hinged plane mirror 26. The lower recombined beam 24 is directed towards a detector 25 when mirror 26 is lowered into position 27. The upper recombined beam 23 is reflected down onto mirror 26 by plane mirror 28. When mirror 26 is lifted into a 45 degree position, lower beam 24 is removed from the detector and upper beam 23 is reflected onto the detector. The optical components are supported within a thermally stable enclosure 38. An off-axis concave mirror 29 focusses the selected recombined beam 35 onto the detector to produce an interference pattern of concentric rings with the detector being aligned with the rings' center. In use, the platform 9 is rotated in one direction through an angle giving the desired optical path length change with mirror 26 in one position. Then, the mirror 26 is put into the other position and platform 1 rotated back to its initial position. The detector output is analysed during each rotation to extract the parts of the spectrum covered by each beam splitter.

The features of the path length variation device are described in British Patent Application No. 8418308.

FIG. 2 shows the radiation directing means of FIG. 1 in more detail. Mirror 26 pivots about axis 31 normal to the plane of the drawing. In the full lined position shown, in which the upper recombined beam 23 becomes the selected beam 35, an adjustable stop 30 consisting of an adjusting screw in a fixed, tapped, hole defines the direction of the switched beam on the detector. In the dotted, lower, position, mirror 26 is lowered out of the path of beam 24, which then passes to the detector as beam 35, beam 23 being absorbed on the instrument casing, not shown. It should be noted than when this switching arrangement is used in an interferometer which is part of a Fourier transform spectrometer, such as will be described later with reference to FIG. 4, the position of the mirror 26 only needs to be stable during the scanning of an interferogram and it does not need to have an accurately reproducible position.

FIG. 3 shows another switching arrangement which makes use of a mirror mount 32, rotatable about an axis 33 normal to the plane of the drawing. Two plane mirrors 34 and 36 are fixed rigidly to mount 32 with their reflecting surfaces facing and parallel to one another and parallel to axis 33. In the full lined position shown, beam 23 is reflected once off each of mirrors 34 and 36 and emerges as beam 35 parallel to its original direction regardless of the angular position of mount 32 provided beam 23 is incident on both mirrors. The parallelism of the switched beam 23 to its original direction is assured with a wide tolerance of the switched position of mount 32. The effect of variation in the switched position of the mount is to shift the switched beam laterally parallel to itself as shown at 37. Since the interference ring pattern is produced at the focus of concave mirror 29, the position of the center of the ring pattern is not affected by this lateral shift.

The switching arrangements of FIGS. 2 and 3 show how the recombined beams of two interferometers may be switched onto one detector. It will be obvious to those skilled in the art that more than two interferometers may be combined by a sequence of the switches of FIGS. 2 or 3 operated one at a time to select one recombined beam for the detector.

A Michelson interferometer has been described in relation to FIG. 1 but it will also be obvious that any known interferometer producing a parallel recombined beam may be used. Also, a particular form of means for varying the optical path length of one arm of each interferometer has been described using a pair of plane parallel mirrors rotated as an assembly. Other known methods of path length variation may be used in the interferometers. Reference may be had to the textbook "The Design of Optical Spectrometers" by J. F. James and R. S. Sternberg, Chapman and Hall 1969 Chapter 8 for details of interferometers and other path length variation devices. Also, U.S. Pat. No. 4,383,762 describes some further optical path length variation devices which could be used with the invention.

The invention will now be described in relation to its use in a Fourier transform spectrometer working in the infra-red region. In this region, individual beam splitters have a limited wavelength range owing to problems of available materials and of the design of filter coatings to give 50% transmission and 50% reflection. To achieve a useful range, from 4000 cm$^{-1}$ to 200 cm$^{-1}$ for example, a pair of beam splitters is required, each covering part of the range.

FIG. 4 shows a Fourier transform spectrometer in accordance with the invention. The optical components of the spectrometer are supported and registered in relative position by a structure 39, which is box-like in general form and has internal walls. The input beams 12 and 13 are supplied by a broad-band infra-red radiation source 1 and collimated by concave mirrors 2 and 3 respectively, the remainder of the double interferometer being as described with reference to FIG. 1.

The plane mirrors 6 and 11 of the interferometer of FIG. 1 are mounted upon angular tilt adjusters which may be of the kind described in copending British Patent Application No. 8416263, corresponding to U.S. patent application Ser. No. 748,524, filed Jun. 25, 1985, now U.S. Pat. No. 4,637,645. One of the adjusters provides tilt of the reflected beams in one plane with the other adjuster providing tilt of its associated beams out of that plane. When the instrument is set up during manufacture, the adjusters are used to center the fringe pattern of the recombined beam 35 on the detector 25. The adjusters are then locked in position relative to the structure in the stress-free manner described in the above copending patent Application.

The platform 1 is driven in rotation by a motor 102 mounted off the supporting structure. A pilot beam 106 of visible radiation from, for example, a helium-neon laser 90 is also fed through the optical path of one of the interferometers with interference fringes being formed by a recombined beam 93 on a separate detector 94. The output of this detector is used in a waveform shaping circuit 96 to generate sampling instant signals which occur at intervals of one wavelength or fractions thereof of the laser source as the optical path length is changed. These sampling signals control the instants at which the output of detector 25 is sampled to provide inputs to a computer 97 which calculates the spectrum 98 of beam 35 using, for example, a program based on the known Cooley Tukey algorithm. In addition the platform drive motor 102 is controlled in speed by control circuit 101 in response to the sampling instant signals to keep the rate of sampling constant.

The selected combined beam 35 emerging from the switching arrangement passes through a sample 95 of a substance whose absorbance as a function of wavelength is to be measured. The concave focussing mirror 29 is represented schematically as a lens element.

In a practical interferometer the bottom interferometer of FIG. 1 may be used for the short wavelength range from, for example, $2.5\mu$ to $25\mu$ since the positions of the optical components are more critical at short wavelengths and the combined beam of this interferometer is used for the long wavelength range from, for example, $25\mu$ to $50\mu$.

As a manufacturing operation, the lower interferometer is set up first, using the fixed beam return mirrors 6 and 11 to align the center of the fringe pattern on the detector. The visible laser fringe pattern can be used for this operation, after which white light is used to find the center white light fringe only visible when the optical path length of the two arms have been equalised by rotation of platform 9. Then the infra-red source can be used and the final alignment of mirrors 6 and 11 made to maximise detector 25 output. Then the upper combined beam is selected using the switching arrangement and the upper beam splitter 4 and the mirror stop 30 being adjusted to maximise detector 25 output, centralising the long wavelength fringe pattern on the detector.

A beam switching arrangement as shown in FIG. 2 or FIG. 3 may also be used to provide the two input beams 12 and 13 as alternative inputs to the two interferometers as shown in Figure 5. A single concave collimating mirror 3 is used to provide an input beam 43 to a switching arrangement comprising a fixed plane mirror 42 and a hinged plane mirror 40. The input beam 43 passes directly (13) to the lower beam splitter 5 when mirror 40 is lowered into position 41. With mirror 40 hinged upward by an angle of 45°, input beam 43 passes via mirror 42 to the upper beam splitter 4. The motions of mirrors 40 and 26 are linked so that they are either both lowered or both hinged upward, radiation passing through either the upper or lower interferometer.

FIG. 6 shows another embodiment in accordance with the invention, in which components corresponding to those in FIGS. 1 and 5 bear the same reference numerals. The radiation directing means comprises a L-shaped carriage 50 which is slidable in direction 51 along a fixed vertical post 52 of square cross section, the carriage 50 having only the one degree of freedom in direction 51. Direction 51 is normal to the subbeams 14 and 16 and to the recombined beam 23. Carriage 50 carries an input reflecting element in the form of a plane mirror 53, parallel to beams 14 and 23 but inclined at 45° to direction 51. The source 1 provides a collimated input beam vertically downward, parallel to direction 51, which is reflected horizontally towards a stack of beam splitters 4,5 and 55 aligned above one another in a direction parallel to direction 51. Carriage 50 also carries an output reflecting element in the form of a plane mirror 56 parallel to beams 12 and 16 but inclined at 45° to direction 51 so as to reflect the recombined beam 23 vertically downward onto detector 25 via focusing means now shown for clarity. The input and output reflecting elements could alternatively be prisms. A lowered position 57 of the carriage is shown dotted in which the input beam 13 is parallel to beam 12, its former position, but is lowered and now enters beam splitter 5. The recombined beam 24 now emerges lower than beam 23, its former position, but after reflection at lowered mirror 56 emerges along its original path 35 to the detector. If the carriage is moved upward, the beam splitter 55 will be selected. Further beam splitters may be placed in the stack, the limitation in number being given by the beam diameter and the maximum practical height of the plane mirrors 6, 11 which return the subbeams and of the plane mirrors 7 and 8 which comprise the optical path length variation device.

The sliding motion of carriage 50 simultaneously increases the distance of mirror 53 from source 1 and reduces the distance of mirror 56 from detector 25 by the same amount, or vice-versa. Thus the optical path length between source and detector remains constant with beam splitter changes. An advantage of this fact is that imaging from source to detector is constant. The source has a finite size and the input beam is consequently only quasi-parallel after the collimating lens. The width of the beam at the detector lens is thus constant with this arrangement. The detector lens can consequently be a minimum size to accept the whole of the recombined beam from any beam splitter.

I claim:

1. An interferometer comprising a radiation source, a plurality of beam splitters, each of said plurality of beam splitters functioning in a different part of the spectrum of said radiation source, radiation directing means for guiding an input beam of radiation from said radiation source through one of said beam splitters to produce two subbeams which traverse separated paths before returning to said one beam splitter to form a recombined beam, and means for varying the difference in path length of said two subbeam paths, characterised in that said plurality of beam splitters are in fixed locations, and in that said radiation directing means is effective to pass said recombined beam from said one of said beam splitters to an output.

2. An interferometer as claimed in claim 1, characterised in that said radiation directing means further comprises means for producing separate input beams, one for each of said plurality of beam splitters.

3. An interferometer as claimed in claim 1 or claim 2, characterised in that said radiation directing means comprises a first fixed mirror on which a first recombined beam is incident and a second movable mirror, said second mirror being movable between a first position for directing the first recombined beam reflected from said first mirror to said output and a second position for permitting said second recombined beam to pass to said output.

4. An interferometer as claimed in claim 1 or claim 2, characterised in that said radiation directing means comprises a mirror unit, said mirror unit comprising a pair of plane parallel mirrors, the planes of the mirrors being separated from one another, and said unit being rotatable about an axis parallel to the planes of the mirrors from a first position, in which one recombined beam is reflected by each mirror of the unit to emerge on a path to the detector, to a second position in which the other recombined beam passes directly along said path to said output.

5. An interferometer as claimed in claim 2, characterised in that said means for producing separate input beams comprises means for directing a single input beam to a selected one of the beam splitters.

6. An interferometer as claimed in claim 1, characterised in that said radiation directing means comprises a carriage carrying an input reflecting element and an output reflecting element, said carriage being mounted on a slide and being movable to a plurality of positions, said input reflecting element being effective to direct radiation from said radiation source onto said one beam splitter in each of said positions, and said output reflecting element being effective to direct said recombined beam from said one beam splitter to said output.

7. An interferometer as claimed in claim 6, characterised in that said carriage is slidable in a direction parallel to the plane of said plurality of beam splitters, in that said input and output reflecting elements are at 45° to the direction of movement of said carriage, and that said input beam and said reflected combined beam are parallel to the direction of movement of said carriage.

8. An interferometer as claimed in claim 1 or claim 2, characterised in that said subbeams from each of said plurality of beam splitters share a common means for varying the path length difference.

9. An interferometer as claimed in claim 8, characterised in that the first of the subbeams from each of said plurality of beam splitters traverses a path of fixed length before returning to the beam splitter, and in that the second subbeam from the beam splitter traverses a path by a common path length variation device before returning to the beam splitter.

10. An interferometer as claimed in claim 9, characterised in that the common path length variation device comprises a plurality of plane mirrors rigidly connected together to form an assembly, means for directing the second subbeam onto a first mirror of said assembly, said mirrors being mounted so that said second subbeam traverses said assembly by way of reflections from each of said mirrors and emerges from said assembly in a direction parallel to and in the same direction as the direction of incidence on said first mirror of said assembly, and means for rotating said assembly about an axis so as to change the angle of incidence of said second subbeam on said mirrors to vary the optical path length of said second subbeam.

11. An interferometer as claimed in claim 10, characterised in that a plane beam reversing mirror is provided in the path of and normal to the emergent second subbeam, whereby said emergent second subbeam retraces its path through the mirror assembly to said beam splitter.

12. An interferometer as claimed in claim 11, characterised in that said mirror assembly comprises a pair of plane parallel mirrors, the planes of the mirrors being separated from one another, said mirrors extending parallel to the rotation axis to accept all the second subbeams.

13. An interferometer as claimed in claim 12, characterised in that the rotation axis is substantially parallel to the mirror surfaces of the plane mirror pair.

14. An interferometer as claimed in claim 13, characterised in that the input beams are parallel to one another, the subbeams are parallel to one another, and the recombined beams are parallel to one another, and in that a first common plane beam reversing mirror is provided for the first subbeams and a second common beam reversing mirror is provided for the second subbeams.

15. An interferometer as claimed in claim 8, characterised by means for focussing the selected recombined beam onto a detector.

16. A Fourier transform spectrometer including an interferometer as claimed in claim 15, and comprising means for processing the detector output signal as a function of variation in optical path difference of the selected subbeams to provide the spectrum of the radiation.

17. A Fourier transform spectrometer as claimed in claim 16, characterised in that the interferometer is mounted in a supporting structure suspended within a thermally insulating enclosure.

18. An interferometer as claimed in claim 10, characterized in that said mirror assembly comprises a pair of plane parallel mirrors, the planes of the mirrors being separated from one another, said mirrors extending parallel to the rotation axis to accept all the second subbeams.

19. An interferometer as claimed in claim 18, characterized in that the rotation axis is substantially parallel to the mirror surfaces of the plane mirror pair.

20. An interferometer as claimed in claim 19, characterized in that the input beams are parallel to one another, the subbeams are parallel to one another, and the recombined beams are parallel to one another and in that a first common plane beam reversing mirror is provided for the first subbeams and a second common beam reversing mirror is provided for the second subbeams.

* * * * *